United States Patent

Brown, Jr.

[11] 4,187,823
[45] Feb. 12, 1980

[54] HIGH SWIRL INLET PORT

[75] Inventor: William L. Brown, Jr., Peoria, Ill.

[73] Assignee: Caterpillar Tractor Co., Peoria, Ill.

[21] Appl. No.: 883,103

[22] Filed: Mar. 3, 1978

[51] Int. Cl.² .............................................. F01L 3/00
[52] U.S. Cl. .............................. 123/188 M; 123/52 M
[58] Field of Search ....................... 123/188 M, 52 M

[56] References Cited

U.S. PATENT DOCUMENTS

| 1,526,963 | 2/1925 | Chandler | 123/188 M |
| 3,045,655 | 7/1962 | Formia | 123/188 M |
| 3,411,490 | 11/1968 | Akana | 123/188 M |
| 3,429,303 | 2/1969 | Roberts | 123/188 M |

FOREIGN PATENT DOCUMENTS

| 110447 | of 1964 | Czechoslovakia | 123/188 M |
| 1015269 | 9/1957 | Fed. Rep. of Germany | 123/188 M |
| 1601379 | 5/1970 | Fed. Rep. of Germany | 123/188 M |
| 619451 | 11/1958 | Italy | 123/188 M |
| 497498 | 12/1938 | United Kingdom | 123/188 M |
| 881089 | 11/1961 | United Kingdom | 123/188 M |

Primary Examiner—Charles J. Myhre
Assistant Examiner—David D. Reynolds
Attorney, Agent, or Firm—Phillips, Moore, Weissenberger, Lempio & Majestic

[57] ABSTRACT

A straight duct serves as an air flow entry passage to deliver air to a valve in a cylinder head, said valve being located to deliver air tangentially into the cylinder bore. The duct leaves the valve at such an angle that a center line of the duct forms a 30° to 50° angle with the valve axis, an inner wall forms an angle of at least 40° with the valve axis and an outer wall forms an angle of 30° to 50° with the valve axis. The duct has a generally circular or oval cross-section and the inside of the outer wall, if extended in the direction of air flow, would clear the valve seat.

7 Claims, 4 Drawing Figures

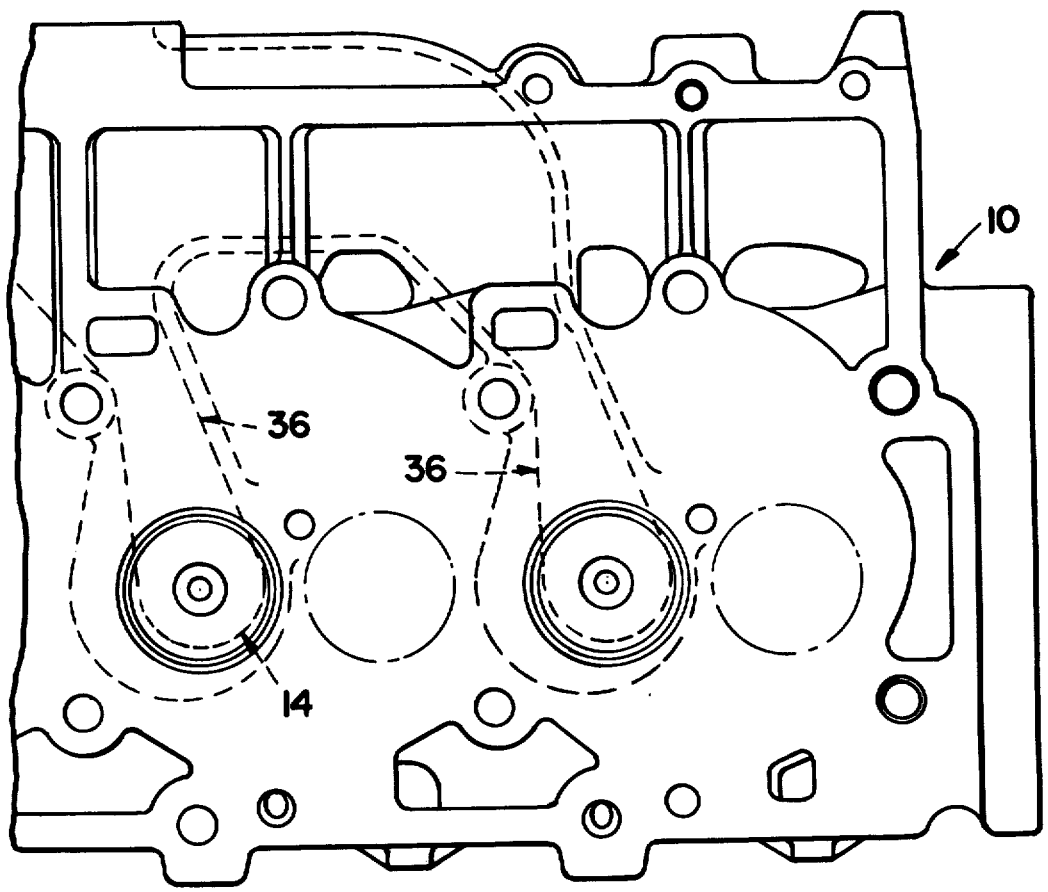
FIG_1
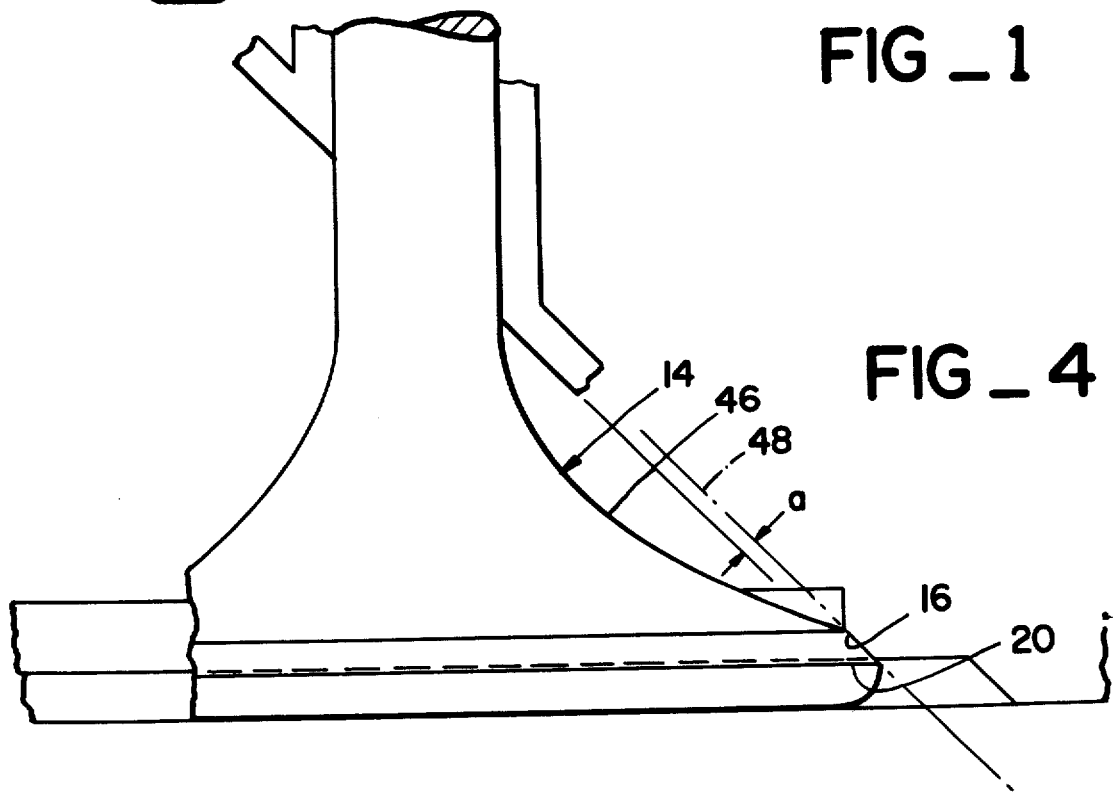
FIG_4

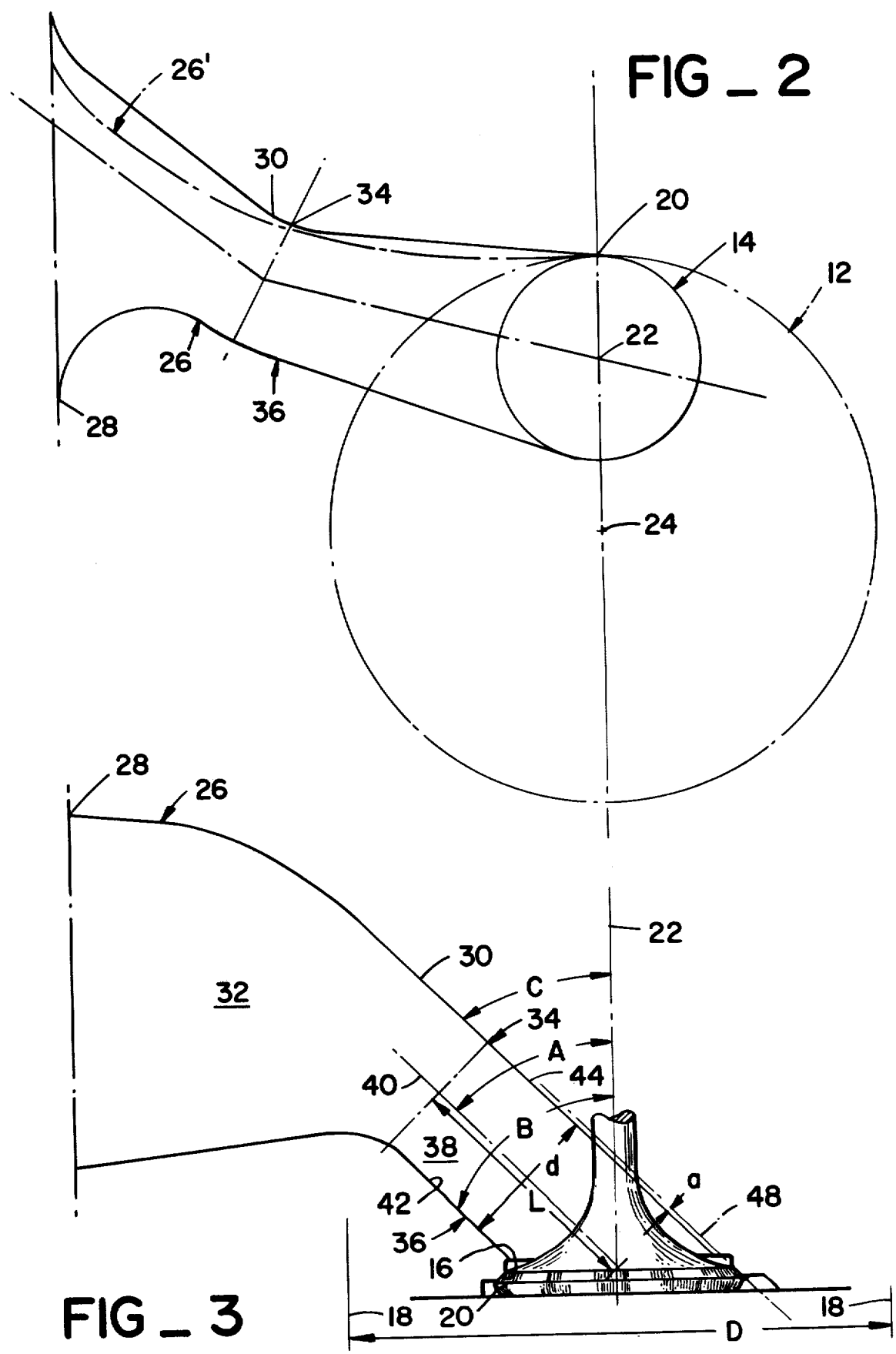

HIGH SWIRL INLET PORT

BACKGROUND OF THE INVENTION

1. Field of the Invention

The invention relates to air entry passages such as are used in several types of engines and as are particularly useful in direct injection diesel engines. Such passages are also useful in stratified charge engines.

2. Prior Art

Swirl type inlet passages for diesel engines fall generally into tangential types where the air is introduced tangentially into the cylinder bore through a somewhat straight passage and snail types wherein the air is pre-swirled within the passage itself which is shaped somewhat like the shell of a snail and in addition is introduced tangentially to the cylinder bore. Through use of the snail type passages one might hope to obtain a better swirl of the air as it is introduced into the cylinder bore. However, such snail type passages are relatively inefficient since there is considerable loss of energy as the air is directed therethrough. On the other hand, the prior art somewhat straight passages which introduce air tangentially into the cylinder bore have not produced sufficient swirl. A tangential type straight passage which would accomplish adequate swirl but with only minimum energy losses would thus be highly desirable. Also, such a design could be expected to take up less valuable space about the engine than do the snail type air entry passages.

SUMMARY OF THE INVENTION

The present invention is directed to overcoming one or more of the problems as set forth above.

According to the present invention an improved air flow entry passage configuration is provided for an internal combustion engine which comprises at least one cylinder bore and a corresponding number of generally circular inlet valves, each of the valves opening to a head of a respective cylinder bore, each of the valves having a periphery thereof substantially tangent to said respective cylinder bore and each of the valves having an axis thereof substantially parallel to an axis of said respective cylinder bore. The improved configuration comprises a generally straight duct serving as said air flow entry passage to deliver air to said valve at such an angle that a center line of said duct forms an angle, A, of 30° to 50° with said valve axis, an inner wall of said duct forms an angle, B, of at least about 40° with said valve axis and an outer wall of said duct forms an angle, C, of 30° to 50° with said valve axis, said duct having a generally circular or generally oval cross-section, the inside of said outer wall if extended in the direction of air flow clearing a seat of said valve.

BRIEF DESCRIPTION OF THE DRAWINGS

The invention will be better understood by reference to the figures of the drawings wherein like numbers denote like parts throughout and wherein:

FIG. 1 illustrates in partial top view, a diesel engine utilizing a plurality of passages in accordance with the present invention;

FIG. 2 illustrates in schematic plan view an individual passage in accordance with the present invention with a cylinder bore shown in phantom;

FIG. 3 comprises a schematic side view, partially in section, of a passage in accordance with the present invention with a cylinder bore shown in phantom; and FIG. 4 is an enlarged partial view illustrating a critical structural feature of an air passage in accordance with the present invention.

DETAILED DESCRIPTION OF THE PREFERRED EMBODIMENT

Adverting to the Figures, there is illustrated therein a top view of an internal combustion engine 10 the top view of which shows primarily the cylinder head and more particularly a direct injection type diesel engine which comprises a plurality of cylinder bores 12 and a corresponding plurality of generally circular valves 14. Each of the valves 14 opens via a valve seat 16 to a head end 18 of a respective one of the cylinder bores 12 (see FIGS. 3 and 4). A periphery 20 of each of the valves 14 is substantially tangent to the respective one of the cylinder bores 12 and each of the respective valves 14 has an axis 22 thereof substantially parallel to an axis 24 of the respective cylinder bore 12.

Air enters a respective downstream converging air funneling section 26 (or alternatively 26' shown in phantom) at an upstream end 28 thereof and then exits the air funneling section 26 at a downstream end 30 thereof through a smooth curved tapered area 32 to provide minimal turbulence. The curving occurs to avoid other engine components. The air which exits the downstream end 30 of the air funneling section 26 enters an air entry end 34 of a duct 36 constructed in accordance with the present invention.

The duct 36 is generally straight to reduce losses and serves as an air flow entry passage 38 for delivering air to the valve 14. The duct 36 leaves the valve 14 at such an angle that a center line 40 of the duct forms an angle, A, of 30° to 50° with the valve axis 22. An inner wall 42 of the duct 36 is defined as that portion of the duct 36 nearest to the cylinder bore 12. The inner wall 42 forms an angle, B, of at least about 40° and generally from about 40° to about 50° with the valve axis 22. An outer wall 44 of the duct 36 is defined as that portion of the duct 36 furthest from the cylinder bore 12. The outer wall 44 of the duct 36 forms an angle, C, of 30° to 50° with the valve axis 22. The duct 36 has generally circular or generally oval cross-sections along the extension thereof it being understood that at different positions along the extension of the duct 37 the cross-section may differ. If the angles A, B and C are kept within the specified ranges a very effecient passage results which produces more swirl than prior art straight passages.

The outer wall 44, if extended in the direction of air flow, must critically clear the seat 16 of the valve 14 on the inside thereof by a distance, a. This is necessary to assure that no obstruction is present at this location and that air flow cleanly separates. Unexpectedly, requiring such clearance has led to the attainment of the needed swirl within the cylinder bore 12. When the cylinder bore 12 has a diameter, D, the extending of the outer wall 44 should lead to an inside clearance, a, of the valve seat 16 of from about 0.005D to about 0.015 from the inside of the outer wall 44. Basically, entering air flows across a generally conical top 46 of the valve 14 and tangentially into the cylinder bore 12 with clean air flow separation at the valve seat 16 and with very adequate swirl, considerably more swirl than attained with prior art straight duct tangential air passages which do not have the required valve seat clearance. In FIG. 3 and 4 a dashed line 48 represents an extension of the valve seat 16 and shows the clearance, a, which is the same as the clearance of an extension of the inside of the outer wall 44 from the valve seat 16.

The length, L, of the duct 36, for most efficient operation in accordance with the present invention should be related to the mean diameter, d, of said duct 36. The length, L, of the duct 36 can be defined as the length of the center line 40 thereof from a plane defined by the valve seat 16 to the air entry end 34 of the duct 36. Generally, the length, L, of the duct 36 should fall within a range from about 1.0 to about 2.5 times the aforementioned mean diameter, d, of duct tube 36 to assure most efficient operation of the air passage 38.

By working with an air flow entry passage 38 in accordance with the present invention, one attains adequate swirl in the cylinder bore with a minimum of losses. What results is a highly efficient swirl-type air entry passage 38.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In an internal combustion engine which comprises at least one cylinder bore and a corresponding number of generally circular inlet valves, each of said valves opening to a head of a respective cylinder bore, each of said valves having a periphery thereof substantially tangent to said respective cylinder bore and each of said valves having an axis thereof substantially parallel to an axis of said respective cylinder bore, an improved swirl-type air flow entry passage configuration, comprising:
   a generally straight duct serving as said air flow entry passage to deliver air to said valve, said duct leaving said valve at such an angle that a centerline of said duct forms an angle, A, of 30° to 50° with said valve axis, an inner wall of said duct, which comprises that portion of said duct nearest to the cylinder bore, forms an angle, B, of at least about 40° with said valve axis and an outer wall of said duct, which comprises that portion of said duct farthest from the cylinder bore, forms an angle, C, of 30° to 50° with said valve axis, said duct having a generally circular or oval cross-section, said outer wall if extended in the direction of air flow clearing, on the inside, a seat of said valve.

2. An improved passage as in claim 1, wherein said cylinder bore has a diameter, D, and said extending of said outer wall leads to a clearance of said valve seat of from about 0.005D to about 0.015D.

3. An improved passage as in claim 1, wherein said duct walls are defined in a shape such that air flow clears substantially all of said valve seat coextensive with said duct.

4. An improved passage as in claim 1, wherein said duct has a length, L, from its intersection with a plane defined by said valve seat to an air entry end thereof which falls within a range from about 1.0 to about 2.5 times a mean diameter, d, of said duct.

5. An improved passage as in claim 4, including:
   a converging air funneling section having a downstream end thereof smoothly joined to said air entry end of said duct.

6. An improved passage as in claim 1, including:
   a converging air funneling section upstream of the generally straight portion having a downstream end thereof smoothly joined to an entry end of said straight duct.

7. An improved passage as in claim 6, wherein said cylinder bore has a diameter, D, and said extending of said outer wall leads to a clearance of said valve seat of from about 0.005D to about 0.015D.

* * * * *